July 18, 1950     H. L. BARBER ET AL     2,515,392
APPARATUS FOR SORTING AND TESTING STICKS Filed Dec. 31, 1945     3 Sheets-Sheet 1

INVENTORS
Hiram L. Barber
BY George L. Sellars
Wood, Arey, Herron & Evans
Attorneys

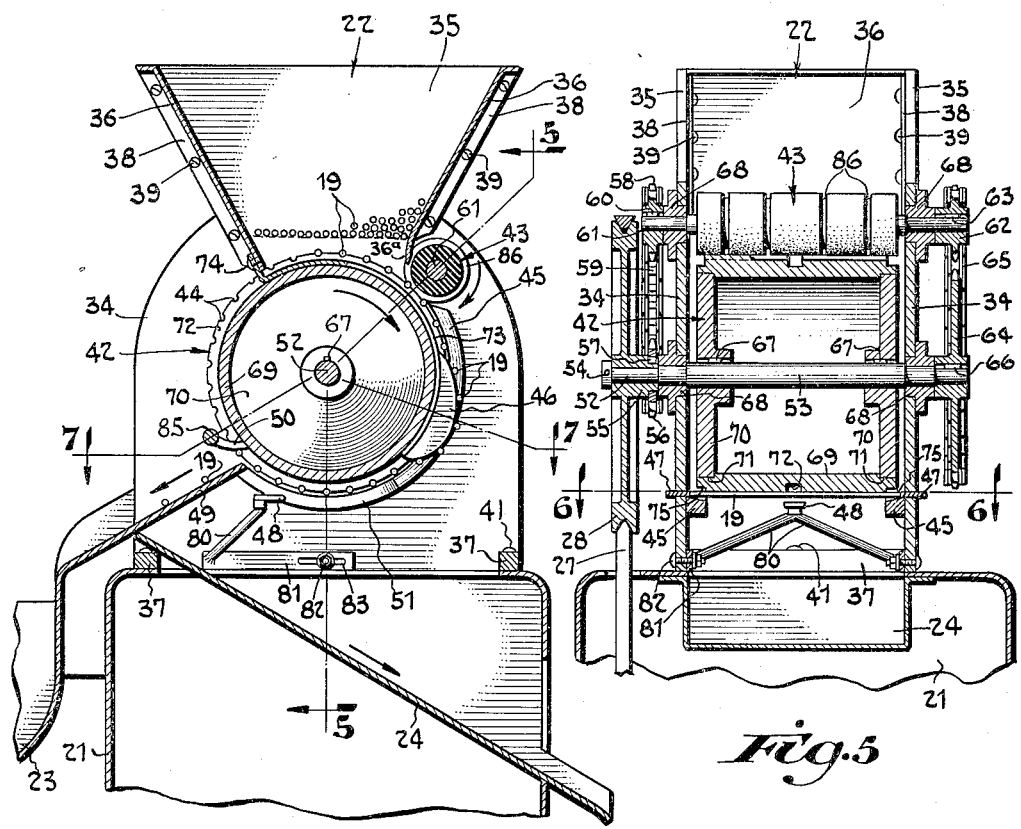

INVENTORS.
Hiram L. Barber
BY George L. Sellars
Wood, Arey, Herron & Evans
Attorneys Patented July 18, 1950

2,515,392

UNITED STATES PATENT OFFICE 2,515,392

APPARATUS FOR SORTING AND TESTING STICKS

Hiram L. Barber, Newtown, and George L. Sellars, Milford, Ohio

Application December 31, 1945, Serial No. 638,595

15 Claims. (Cl. 209—79)

This invention relates to an apparatus for testing and sorting relatively slender sticks, primarily of the class used in making cotton swabs, to be used as medical applicators.

More particularly, the invention is directed to an apparatus for performing an inspection procedure in a rapid and convenient manner, to determine whether or not the sticks individually meet specified physical requirements as to strength, flexibility and stiffness, and whether or not they fall within specified dimensional limits.

In the present example the sticks may be approximately six inches long, approximately one tenth of an inch in diameter, and substantially round in cross section. The sticks are made into swabs by winding a length of cotton at one or both ends, the cotton being in the form of a tapered wad, round in cross section, covering the end of the stick.

Cotton swabs of this type are extensively used by physicians, nurses and others in treating the throat, nose, ears and in other similar applications of relatively delicate nature. It is imperative, therefore, that the sticks be reasonably dependable as to strength, and be of uniform quality, since breakage may cause injury to the person being treated.

The sticks are of wood and such material is subject to variations in strength due to quality, hidden defects, splitting of the grain, etc. Therefore, in order to be assured of uniform strength and quality it is necessary to test or inspect the sticks individually. Heretofore this operation has always been performed by hand.

Of primary importance is the strength factor, especially in view of the conditions of use. It also is highly desirable that the sticks be relatively uniform in diameter and length dimension.

It is the concept of the inventors to test the sticks for strength by mechanical means which flexes each stick individually to a predetermined degree of curvature, then permits the stick to return to a normal unflexed condition. This treatment is followed by applying a compressive force against opposite ends of the sticks individually.

The first treatment is designed to eliminate sticks which are deficient in resiliency and sticks which because of brittleness, or because of hidden defects, are unfit for use, and would be likely to break in the hands of the user. This treatment also eliminates sticks which are slightly under specified length tolerances.

The second treatment eliminates those sticks which only partially fail the flexing treatment of the first, and further eliminates those sticks which may be sufficiently flexible, yet lack sufficient strength to be usable for the purpose intended; for example, sticks which are too small in diameter and therefore of insufficient strength.

Briefly the apparatus subjects the sticks to a test similar to the treatment they are likely to encounter in actual use except that in the test the forces applied go beyond those likely to be applied in use, thereby providing a factor of safety.

The apparatus is automatic in character and is arranged to run continuously, the sticks being fed individually from a hopper through the machine. The testing devices are pre-set and are designed to subject each stick individually to a uniform test, and automatically to reject those which fail to meet the tests.

It is therefore an object of the inventor to provide an automatic mechanism which subjects the sticks individually to a series of tests to determine their fitness as to strength and flexibility and as to diameter and length dimension, and which automatically rejects those which fail to meet specified requirements.

It is another object to provide an automatic mechanism which is capable of relatively high speed operation and which tests and sorts the sticks, to supply a uniform grade of sticks at a production scale of operation.

It is a further object to provide an automatic mechanism which is capable of being pre-set to subject the sticks to treatment and stress similar to that encountered in actual use, the forces applied being of magnitude greater than ordinarily applied in use, to provide a factor of safety.

Other objects and advantages will be more fully set forth in the description of the accompanying drawings disclosing a preferred embodiment of the invention and in which:

Figure 4 is an enlarged sectional view taken on line 4—4, Figure 2, illustrating in general, the sorting apparatus.

Figure 5 is a sectional view taken on line 5—5, Figure 4.

Figure 6 is a sectional view taken on line 6—6, Figure 5.

Figure 7 is a sectional view taken on line 7—7, Figure 4.

Figure 1:
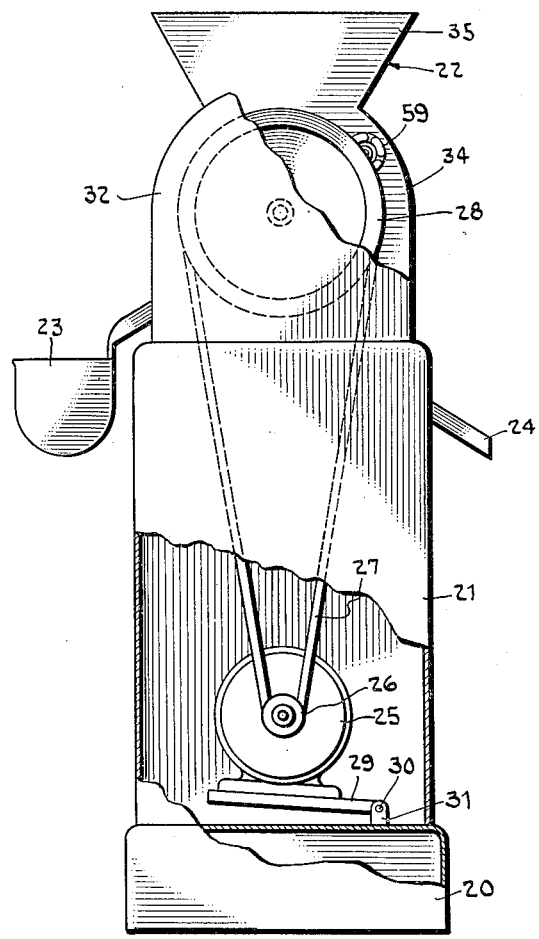
Figure 1 is a side view showing the general arrangement of the machine with parts broken away to illustrate the drive and motor mounting.
Figure 2:
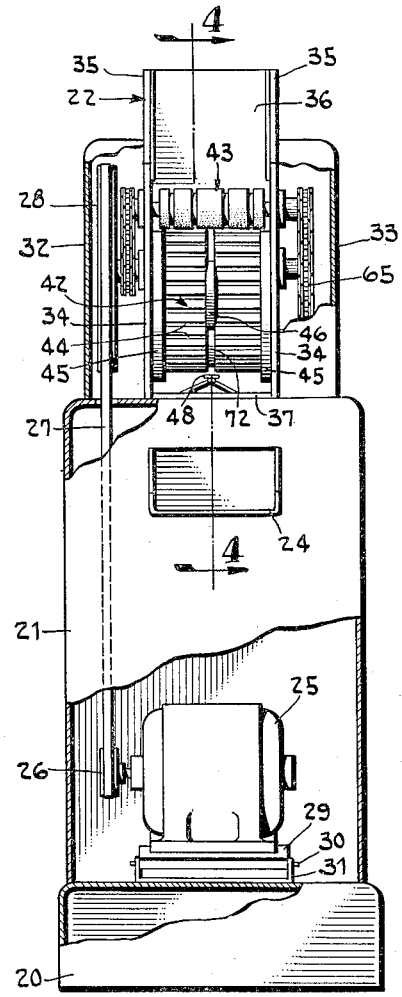
Figure 2 is a rear elevation similar to Figure 1.
Figure 3:
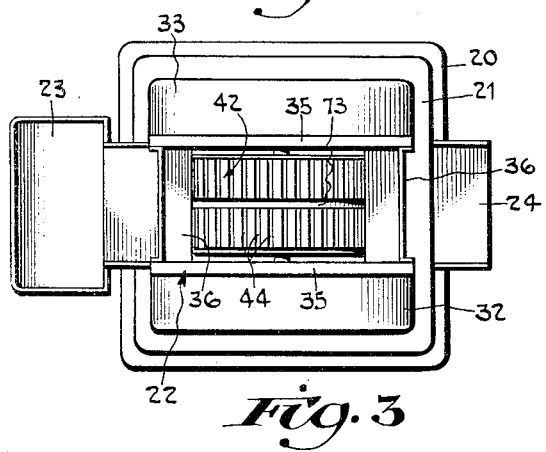
Figure 3 is a top plan view of the machine as shown in Figures 1 and 2.

Referring to Figures 1, 2 and 3 of the drawings the machine comprises in general a square or rectangular base 20, a pedestal 21 secured thereon, and a hopper 22 mounted on the top of the pedestal at a height convenient for operation. The hopper is adapted to contain a supply of the sticks 19 to be fed into the machine for testing and sorting.

The sticks pass individually through the machine in a continuous series and are tested as to physical dimensions, strength and flexibility. Those sticks which fall within the limits specified pass to a stick receiving hopper 23 located at the front of the machine. The defective sticks are discharged from a chute 24 located at the rear of the machine.

The mechanism is powered by means of an electric motor 25 located inside the pedestal 21 upon the base 20. The motor includes a drive pulley 26, connected by means of a belt 27 to a driven pulley 28, which is in driving connection with the sorting apparatus.

The belt and pulleys preferably are of the commercial V type, and the motor mounting is designed for automatic tensioning of the belt. For this purpose the motor is mounted upon a platform 29, one end of which is pivoted as at 30 to a bracket 31 secured to the upper surface of the base 20. As a result of this arrangement, the motor is suspended by the belt thereby keeping the belt under constant tension and eliminating the need for adjustments. An access opening (not shown) may be provided in the pedestal adjacent the motor to permit lubrication and other servicing of the motor.

The driven pulley 28 at the upper portion of the machine may be enclosed by means of a removable cover or guard 32 as a protection to the operator and to keep out dust and dirt. A similar cover 33 is provided at the opposite side of the machine to enclose a driving sprocket and chain hereinafter described.

Referring to Figures 4 and 5 generally illustrating the sorting or testing mechanism, the apparatus is comprised generally of a pair of spaced parallel side plates 34—34, forming a casing for the testing apparatus. These plates are shaped identically and include flared upper portions 35 forming the side walls of the hopper. The spacing of these plates is determined by the length dimension of the assorted sticks which are to be placed in the hopper crosswise or at right angles to the side plates.

The end walls of the hopper consist of end plates 36—36 secured along opposite edges of the flared upper portions 35, thus making up a four sided hopper open at the top and having converging end walls communicating with a feed drum as hereinafter described.

The side plates 34—34 are held in spaced relation by the end plates 36 at the upper portion thereof and at the lower portion by means of a pair of spacer bars 37—37, one at the front and rear respectively. The end plates 36 may include flanges indicated at 38, the flanges secured by screws 39 or other means to the flared plates 35. The spacer bars 37—37 are secured at respective opposite ends to the side plates 34 by means of screws 40 and the bars may be secured to the top of the pedestal 21 by means of the screws 41.

The lower open portion of the hopper communicates directly with a rotating feed drum generally indicated at 42 journalled in the side plates 34—34 immediately beneath the hopper. The assorted sticks are placed in the hopper in stacked relationship and the lower portion of the stack is therefore resting upon the rotating feed drum, the sticks being picked up individually by the drum for passage through the apparatus as hereinafter disclosed.

The feed drum 42 extends across the full distance between the side plates with an appropriate running clearance between the side plates and the ends of the drum. An auxiliary feed roller generally indicated at 43 preferably of rubber or other resilient material cooperates with the drum 42 in feeding the sticks individually from the hopper.

For the purpose of picking up the sticks 19, the periphery of the drum includes a series of spaced parallel cross slots 44, semicircular in cross section. These slots are slightly larger than the diameter of the sticks, each being capable of receiving one stick readily but incapable of receiving more than one.

The individual sticks drop into the cross slots by virtue of the pressure created by the weight of the stack in the hopper and are carried by the rotating drum toward the roller 43 by rotation of the drum in the direction of the arrow, as shown in Figure 4. The roller 43 is driven in the same direction as the drum and is in contact with the surface of the drum. The respective surfaces of the drum and roller therefore move in opposite directions at their line of contact, that is, the surface of the roller tends to sweep the sticks 19 back toward the hopper while the drum 42 tends to carry them out. The purpose of this arrangement is to prevent any sticks other than those lodged in the slots from being carried from the hopper, the roller acting in effect, as a separator.

In order to accomplish this result, it is necessary that the surface speed of the roller be considerably greater than that of the drum. Any sticks carried upon the surface of the drum in the space intervening between respective slots, upon encountering the line of contact between the drum and roller, will be frictionally engaged by the roller and swept back toward the hopper. The roller is ineffective with respect to those individual sticks lodged in the slots as these cannot be dislodged by its movement and accordingly are carried beneath the roller and through the machine.

After passing the roller 43 the sticks are carried by rotation of the drum 42 into engagement at opposite ends with a pair of stationary rails 45—45 of arcuate configuration secured to the respective side plates 34—34. These rails serve to maintain the individual sticks in engagement in their respective slots because the sticks are of a length sufficient to extend from one rail to the other in supported position and the drum 42 engages against the sticks forcing them against the rails. (See Figures 5 and 11.) The sticks therefore, are carried by rotation of the drum in an arcuate path toward the stick receiving chute 23, at the front of the machine, unless rejected by the testing apparatus located in the path of the sticks as hereinafter described.

Figure 10:
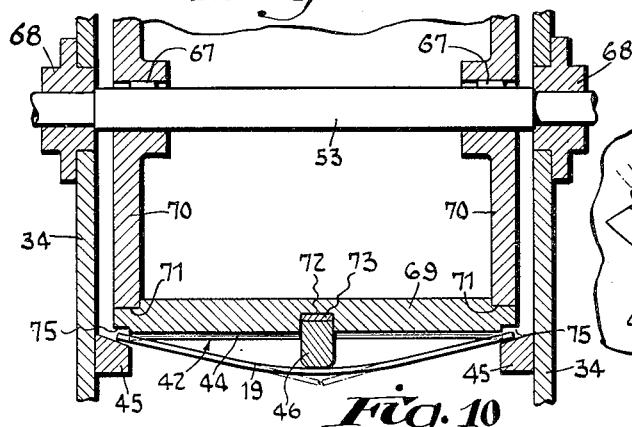
Figure 10 is a fragmentary sectional view similar to Figure 7 diagrammatically illustrating the apparatus at one stage of operation.

The first test to which each stick is subjected is a flexibility test, which test determines the capacity of the sticks to withstand a bending action without breakage and its capacity to return to a straight position. As the sticks traverse the rails 45—45 they encounter a stationary cam-shaped shoe indicated at 46 located approximately centrally of the drum and arranged to engage the sticks centrally and bow or bend them lengthwise and outwardly from the drum as shown in Figure 10. During this stage of operation the ends of the sticks remain in engagement with the rails 45—45 against the pressure of the shoe 46 and the end portions of the sticks remain in engagement in the cross slots to maintain a driving engagement therewith, as imparted by the drum. Any sticks which are slightly under specified length tolerances will at this point snap out of engagement with the rails 45—45 for rejection, due to the shortening effect caused by bending.

Upon encountering the cam 46, the stick slides over the cam surface with its respective opposite ends sliding along the rails 45—45 by reason of the engagement therewith. The shoe has a curved contour gradually rising from its leading edge to a maximum height and imparts a gradual bend or curvature to the stick as the center portion of the stick rides over the contour of the shoe, and then gradually returns to its original shape.

Figure 11:
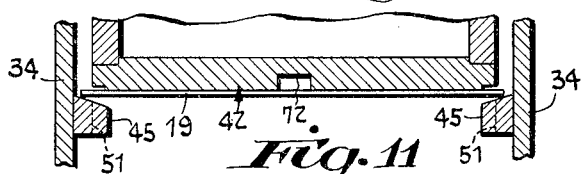
Figure 11 is a diagrammatic sectional view similar to Figure 10 showing the stick returned to a straight condition subsequent to the bowing operation of Figure 10.
Figure 12:
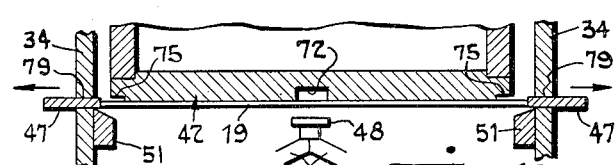
Figures 12 and 13 are diagrammatic sectional views similar to Figure 10 showing the apparatus applying a compression test to a stick at a further stage of operation, Figure 12 showing the action of the apparatus with respect to a sound stick and Figure 13 showing the failure of a defective stick.
Figure 13:
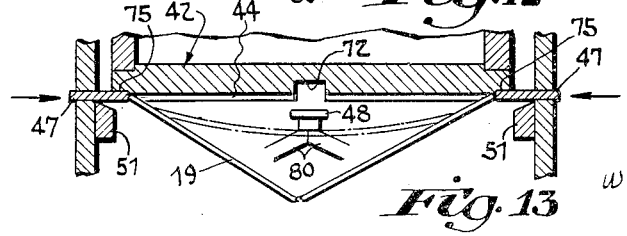

Referring to Figure 10, the stick is here shown in its condition of maximum curvature, the probable location of breakage should the stick fail in this test being indicated in dot-dash lines. After having passed the shoe 46 the stick, in order to pass inspection, should return substantially to its original shape as shown in Figure 11. Should it fail in this and retain its bowed shape it will be rejected either upon encountering an ejecting finger hereinafter described or it will be rejected at the succeeding test as shown in Figures 12 and 13.

Figure 15:
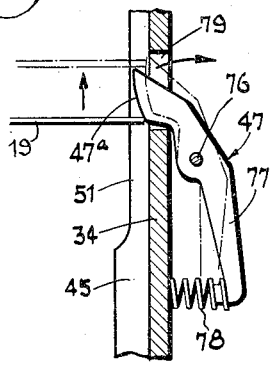
Figure 15 is a sectional view diagrammatically illustrating the operation of one of the pressure fingers with respect to a stick.

As shown in these figures the stick is now passed between a pair of spring actuated pressure fingers 47, providing a compression test. Each finger includes an inclined face 47ª designed to contact the stick at opposite ends, the stick in its feeding movement gradually depressing these fingers outwardly as shown in Figures 12 and 15. Should the stick be in sound and straight condition within the limits set by the apparatus it will force these fingers outwardly as indicated by the arrows shown in Figure 12 and will not suffer injury.

However, should the stick be lacking in resiliency it may retain a partial curvature as a result of having been bowed by action of the shoe 46. In this case the pressure of the fingers 47 will be effective to bow the stick further and cause it either to break or to bend to such an extent that it will be removed from the feed drum upon encountering a stationary ejector finger 48 at a further point of rotation. This condition is diagrammatically illustrated in Figure 13, the bowed stick being indicated in dot-dash lines, the motion of the pressure fingers 47 indicated by the arrows, and the stick being shown snapped at its center and in condition for encountering the ejector finger 48 upon further rotation of the feed drum. The ejector finger arrests the defective stick by hooking the stick at its center and causing it to be pulled from the feed drum because of the continued rotation of the drum.

It will be apparent that a stick which is weak or insufficiently stiff will also fail upon being acted upon by the pressure fingers. By way of example, sticks under the minimum diameter may be sufficiently flexible to pass the shoe 46 and retain straightness. Also sticks of inferior wood, or having flaws or other imperfections, may do the same. But these sticks, although they have sufficient resiliency to pass the shoe 46 will fail upon being compressed endwise by the fingers. The ejector finger 48 will of course eliminate any sticks which retain sufficient curvature for ejection following either of the tests just described.

Figure 14:
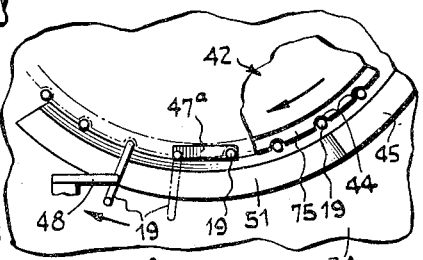
Figure 14 is a fragmentary side view of the apparatus of Figures 12 and 13 further illustrating the compression testing apparatus.

The operation of the pressure fingers 47 is further illustrated in Figures 14 and 15, Figure 15 illustrating in dot-dash lines the movement of one of the fingers with reference to a sound stick. As shown in Figure 14, the inclined face of the pressure finger is positioned adjacent the rail 45 in the path of the sticks. A defective stick which is broken by compression is shown being carried into the path of the ejector finger to be engaged thereby and caused to drop into the discharge chute 24.

As shown in Figure 4, those sticks which are sufficiently straight to clear the ejector fingers 47 now continue in engagement with the drum and are carried to a point where the arcuate rails terminate and are free to drop upon a plate 49 as part of the stick receiving hopper 23. A plurality of stationary scrapers 50 are disposed above the plate 49 and serve to dislodge any sticks which may not fall from the drum by gravity. The discharged sound sticks then roll by gravity to the hopper 23.

For the purpose of rejecting sticks which come under the minimum length requirements and have not been eliminated by action of the shoe 46, the rails 45—45 are provided with cut-out portions at the lower end thereof as indicated at 51, Figure 6. This arrangement permits the sticks which are short of minimum length dimension, as determined by the cut out space, to drop from the rails by gravity to the discharge chute 24. The short sticks are thus separated for rejection before they reach the hopper 23.

In the preferred embodiment of the invention the drum 42 and roller 43 both are driven by means of the large pulley 28. It is necessary to rotate the roller 43 at a speed considerably higher than the speed of the feed drum 42 because of the relative difference in diameters. Furthermore, as previously disclosed, the peripheral speed of the roller must exceed that of the drum in order to cause the roller to sweep the sticks, other than those lodged in the slots, back into the hopper. For this purpose, the pulley 28 is loosely journalled upon the shouldered bearing extension 52 of shaft 53, which also carries the feed drum 42, the feed drum being indirectly driven by the pulley through a sprocket and chain transmission as hereinafter disclosed.

A collar 54 pinned or otherwise secured to the shaft extension 52 serves to prevent endwise displacement of the pulley. The pulley includes an inwardly extended hub 55, carrying a sprocket 56 which may be keyed as at 57 to the hub. The sprocket 56 is in driving connection with a sprocket 58 by means of a chain 59. This sprocket 58 is keyed as at 60 to a shaft 61 which carries the resilient roller 43, the roller being vulcanized or otherwise secured to the shaft. This arrangement constitutes the resilient roller drive and is diagrammatically illustrated in Figure 8.

Figure 9:
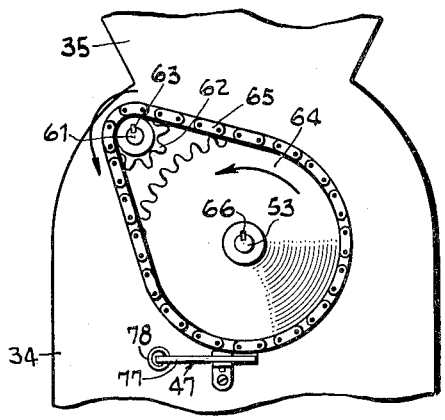

The opposite end of the shaft 61 likewise carries a sprocket 62 keyed to the shaft as at 63 and connected to a relatively large sprocket 64 by means of a chain 65, the sprocket 64 being keyed as at 66 to the shaft 53. The sprocket 64, therefore, drives the drum 42, the drum being keyed as at 67 or otherwise secured to the shaft. This arrangement provides a speed reducing drive for the drum 42 and is illustrated diagrammatically in Figure 9.

The relative pitch diameters of the sprockets 62 and 64 provide a speed reduction between the roller 43 and the feed drum 42 to cause an appropriate over-run of the roller speed with respect to the drum speed to produce the speed differential between drum and roller as described.

As shown, the shafts 53 and 61 may be journalled in bushings 68 set in the respective side plates 34—34. The drum 42 is preferably of hollow construction for weight reduction and may be made up of a cylindrical body section 69 and a pair of end discs 70 pressed or otherwise secured in the opposite ends of the body section. For this purpose the opposite ends of the cylinder may be counterbored as at 71—71.

The drum is provided centrally with a circumferential groove 72. This groove provides a seat for the shoe 46, and also provides clearance for an arcuate strap 73 seated in the groove upon the end of which the shoe is mounted. The opposite end of this strap is anchored upon the hopper as at 74 by screws or other means. By this arrangement the shoe is effectively anchored in its stationary location and the sticks are free of any interference by the strap 73.

The drum is further provided with counterturned end portions 75—75 at respective opposite ends. These provide insets to receive the pressure fingers 47 when the fingers are in compressed position as shown in Figure 13.

Figure 8:
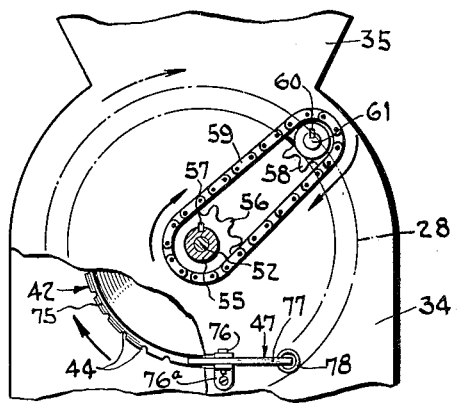
Figures 8 and 9 are fragmentary side views showing the driving sprocket and chains at respective opposite sides of the machine.

As shown in Figures 6 and 8, the pressure fingers 47 are pivotally mounted by means of pins 76 secured in brackets 76ᵃ secured to the side plates 34—34. The fingers are mounted on respective side plates on opposite sides thereof, and each finger includes a shank portion 77 extending relatively parallel with the outer surface of the respective side plate. A compression spring 78 is disposed between the free end of the shank 77 and the side plate, causing the inclined face 47ᵃ of the finger to exert a compressive force against the sticks at opposite ends thereof. An opening 79 is provided in the respective side plates to accommodate the inwardly extended face portions 47ᵃ of the fingers.

The ejector finger 48 is supported by a pair of angularly disposed rods 80, the rods extending in opposite directions downwardly toward the side plates 34. Each rod includes a longitudinal slide rail 81 welded or otherwise secured thereto, the rails being secured to the plates 34 by means of screws 82. In order to provide adjustability, the rails include longitudinal slots 83 permitting them to be shifted longitudinally, thus varying the clearance between the end of the finger 48 and the periphery of the feed drum 42. This adjustment, therefore, determines the limit of curvature beyond which the stick is intercepted by the finger for rejection.

The stationary scrapers 50 for removing the sound sticks from the feed drum are three in number and are mounted upon a stationary bar 85 spanning the side plates at the front of the machine as shown in Figure 7. The bar may be secured by welding or other means to the side plates and the scrapers are set at an angle with their lower ends disposed within the respective counterturned portions 75—75 at the opposite ends of the feed drum. A third scraper has its end disposed within the groove 72 centrally of the drum. This arrangement prevents injury to the stick since the scrapers engage it from beneath and by a camming action dislodge the stick uniformly at three points along its length.

It will be noted that the resilient roller 43 is provided with a series of grooves 86. These are arranged to receive the extensions 36a at the lower edge of the end wall 36 and serve to prevent injury due to the sticks in the hopper being forced upwardly by the roller 43 and binding and jamming between the roller and the edge of the hopper. These grooves also add resiliency to the roller by permitting displacement of the material upon being compressed. It is desirable to provide greater resiliency toward the outer ends where the likelihood of breakage of the sticks is increased. Therefore, the grooves are arranged to provide progressively narrower sections toward the outer ends of the roller, thereby providing increased resiliency in the narrow sections.

In the preferred embodiment described the apparatus is designed to operate at a speed sufficient to deliver 30,000 sticks per hour. This figure is cited to illustrate the decided advantage in production over the usual manual and visual inspection methods. In practice it is quite feasible for one operator to serve several of these machines since the apparatus is completely automatic in operation and ordinarily requires no attention other than keeping the hopper supplied.

It will be apparent that the output of the machine may be increased by increasing the speed of the feed drum, increasing its diameter, or by increasing the number of stick receiving slots around the periphery of the drum, and by other modifications within the scope of this disclosure.

In summary, the apparatus performs an inspection procedure with reference to each stick individually. Each stick must be within fixed limits as the length dimension. If it is over maximum length it will not fit into the hopper or it will hang up because it cannot assume a crosswise position parallel with the feed slots suitable for feeding it from the hopper. If the stick is under minimum length it will be rejected either when it encounters the shoe 46 or upon reaching the cut out portions of the arcuate rails indicated at 51, the stick thereupon dropping by gravity to the discharge chute 24.

The diameter of the stick likewise is held within reasonable tolerances. If the stick is over-size in diameter it will not fit properly in the slots of the feed drum and will be swept back into the hopper upon reaching the resilient roller 43. If under-size to the extent that it is unsuitable for use it will fail and be rejected upon encountering the compression fingers 47.

The physical properties of the sticks with reference to flexibility, stiffness and strength likewise are tested individually. These physical tests serve also to expose any hidden defect, for example such flaws as irregular or cross grain, split grain, and any other factor tending to weaken the stick.

While the apparatus has been disclosed with reference to elongated wooden sticks, it may be that there are various other materials and configurations with which it would be adapted to operate, with or without reasonable modifications.

Although the apparatus herein disclosed constitutes a preferred embodiment of the invention it will be apparent to those skilled in the art that many changes and modifications may be made in the physical structure without departing from the principles of the invention as described in the ensuing claims.

Having described our invention, we claim:

1. Apparatus for sorting and grading elongated wooden sticks or the like comprising a stick conveyor for supporting the sticks in spaced relationship, means for maintaining the ends of the sticks in position adjacent the conveyor, means for moving the conveyor, means for exerting transverse pressure on the central portions of the sticks in said conveyor for flexing the sticks during the conveyor movement to fracture those having insufficient flexing strength, and means for simultaneously holding both endwise portions of each stick against movement in response to such transverse pressure.

2. Apparatus for sorting and grading for length elongated wooden sticks or the like comprising a stick conveyor for supporting the sticks in spaced relationship, rails for restraining both ends of the sticks while they are in supported position, and means for bowing the central portions of the sticks while they are restrained by said rails and thereby disengaging from the conveyor the ends of sticks not of a desired length.

3. Apparatus for sorting and grading for length elongated wooden sticks or the like comprising a rotatable drum for supporting the sticks in spaced relationship, means normally restraining the ends of the sticks against movement away from the drum during rotation, and a stationary shoe engaging the sticks intermediate their ends for bowing the central portions of the sticks and thereby disengaging from the drum the ends of sticks not of a desired length.

4. In a machine for grading elongated wooden sticks or the like, a stick conveyor for supporting the sticks in spaced relationship, a stationary element for bowing outwardly from the conveyor the central portions of the sticks, means for restraining both ends of each stick against movement away from the conveyor while it is being bowed and means for removing from the conveyor the sticks which retain a bowed configuration after they are no longer subjected to the operation of the bowing means.

5. In a machine for grading for strength elongated wooden sticks or the like, a stick conveyor for supporting the sticks and compression elements fixed in the path of movement of the conveyor and constructed to engage the ends of the sticks while so supported and thereby exert an inward pressure on such ends whereby the sticks will be bowed by said compression elements, upon engagement therewith, and those having an insufficient flexing strength will be broken.

6. In a machine for grading elongated wooden sticks or the like comprising a stick conveyor for supporting the sticks in spaced relationship, a stationary element for engaging the sticks intermediate their ends to flex the sticks, means cooperating with said stationary element for restraining both ends of each stick against displacement as it is being flexed by said stationary element and compression means for exerting an inward pressure on the stick ends for bowing said sticks and for fracturing those having an insufficient flexing strength.

7. In a machine for sorting and grading elongated wooden sticks or the like, a stick conveyor for supporting the stick in spaced relationship, a stationary element for engaging and bowing the sticks intermediate their ends and thereby fracturing sticks of insufficient flexing strength, means cooperating with said stationary element for restraining both ends of each stick against displacement as it is bowed by said stationary element, and for removing the fractured sticks from the machine.

8. An apparatus for sorting and grading for length relatively elongated, slender sticks and the like comprising: a hopper arranged to contain a plurality of the sticks in stacked relationship, a rotatable conveyor drum cooperating with the hopper and arranged to feed the sticks individually from said hopper and convey the same in spaced relationship, a pair of stationary arcuate rails, said rails being disposed along relatively opposite sides of said drum and arranged to receive the opposite ends of said sticks, with the intermediate portion of the sticks engaged by the drum to press the same against said rails, a stationary shoe, said shoe located between said rails and including a wedge-like surface adapted to engage the sticks intermediate their ends to bow the central portion of the sticks outwardly between the rails, thereby disengaging from the rails the ends of the sticks of insufficient length, for discharge from the machine.

9. An apparatus for sorting and grading elongated, relatively slender sticks and the like comprising: a hopper arranged to contain a plurality of the sticks in stacked relationship, conveyor means cooperating with the hopper and arranged to feed the sticks individually from said hopper and convey the same in spaced relationship, a pair of spaced stationary rails, said rails disposed along relatively opposite sides of said conveyor and arranged to receive the opposite ends of said sticks with the intermediate portion of the sticks engaged by the conveyor to press the same against said rails, a stationary shoe, said shoe located between said rails and including a wedge-like surface adapted to engage the sticks intermediate their ends to bow the central portion of the sticks outwardly between the rails and then permit the sticks to return to a normal straight condition, a pair of compression fingers, said fingers located adjacent said rails and arranged to engage respective opposite ends of the sticks to compress the same longitudinally, and a stationary ejector finger, said finger located at a point adjacent the conveyor for engaging and removing from the conveyor any fractured or curved sticks.

10. An apparatus for sorting and grading relatively elongated, slender sticks and the like comprising: a hopper arranged to contain a plurality of the sticks in stacked relationship, a rotatable conveyor drum cooperating with the hopper and arranged to feed the sticks individually from said hopper and convey the same in spaced relationship, a pair of stationary arcuate rails, said rails disposed along relatively opposite sides of said drum to receive the respective opposite ends of said sticks, with the sticks engaged between the drum and said rails, a stationary shoe, said shoe located between said rails and including a wedge-like surface adapted to engage the sticks intermediate their ends to bow the central portion of the sticks outwardly from the drum and then to permit the sticks to return to a normal straight condition, a pair of compression fingers, said fingers located adjacent said rails and arranged to engage respective opposite ends of the sticks to compress the same longitudinally, and a stationary ejector finger, said finger being located at a point adjacent the conveyor for engaging and removing from the conveyor any fractured or curved sticks.

11. An apparatus for sorting and grading relatively elongated, slender sticks and the like comprising: a hopper arranged to contain a plurality of the sticks in stacked relationship, conveyor means cooperating with the hopper and arranged to feed the sticks individually from said hopper and convey the same in spaced relationship, a pair of spaced stationary rails, said rails disposed along relatively opposite sides of said conveyor to receive the respective opposite ends of said sticks, with the sticks engaged between the conveyor and said rails, a stationary shoe, said shoe being located between said rails and including a wedge-like surface adapted to engage the sticks intermediate their ends to bow the central portion of the sticks outwardly from the conveyor, then permit the sticks to return to a normal straight condition, a pair of compression fingers, said fingers located adjacent said rails and arranged to engage respective opposite ends of the sticks to compress the same longitudinally, a stationary ejector finger, said finger located at a point adjacent the conveyor for engaging and removing from the conveyor any fractured or curved sticks, a chute associated with said ejector finger, the chute arranged to discharge the curved or fractured sticks engaged by said finger, a stationary scraper, said scraper arranged to dislodge the remaining graded sticks from said conveyor and a chute associated with the scraper and arranged to receive the dislodged sticks.

12. In a machine for grading elongated wooden sticks or the like, a stick conveyor for supporting the sticks in spaced relationship, rails engageable with the sticks to maintain the same in position relative to the conveyor, a stationary shoe disposed between said sticks and conveyor and having a contour adapted to bow the central portion of the sticks outwardly during passage over the shoe, and a pair of compression fingers arranged to engage the sticks after passage over said stationary shoe to apply endwise pressure against the opposite ends of the sticks to cause fracture of those which retain a bowed configuration after passage over said shoe.

13. In a machine for grading elongated wooden sticks or the like, a stick conveyor drum for supporting the sticks in spaced relationship, a pair of rails engageable with the opposite ends of the sticks to maintain the same in position on the conveyor drum, a stationary shoe disposed between said sticks and said conveyor drum having a contour adapted to bow the central portion of the sticks outwardly during passage over the shoe, a pair of resiliently mounted fingers arranged to engage the sticks after passage over said stationary shoe to apply endwise pressure against the opposite ends of the sticks to cause fracture of those which retain a bowed configuration after passage over said shoe, and a stick rejecting element disposed in a position to engage the sticks which have been fractured and to permit passage of unfractured sticks.

14. In a machine for grading elongated wooden sticks or the like, a stick conveyor drum for supporting the sticks in spaced relationship, a pair of rails engageable with the opposite ends of the sticks to maintain the same in position on the conveyor drum, a stationary shoe disposed between said sticks and said conveyor drum having a contour adapted to bow the central portion of the sticks outwardly during passage over the shoe, a pair of spring mounted compression fingers arranged to engage the opposite ends of the sticks after passage over said stationary shoe to apply endwise pressure against the opposite ends of the sticks to cause fracture of those which retain a bowed configuration after passage over said shoe, a stationary stick rejecting finger disposed in the path of movement of the sticks which have been fractured to engage and discharge the same and positioned to permit passage of unfractured sticks, and a stationary finger for dislodging from the conveyor the normal sticks after the same have passed said rejecting finger.

15. A machine for grading elongated wooden sticks comprising, a stick conveyor which is narrower than the length of the sticks to be tested, means for depositing sticks substantially symmetrically upon said conveyor, with the ends of the sticks projecting beyond the sides of said conveyor, rails arranged adjacent the sides of said conveyor along a portion of its path of movement and disposed to be traversed by the projecting ends of said sticks, and a stationary cam-like shoe disposed substantially centrally intermediate said rails in position to be engaged by sticks on said conveyor and cause them to be flexed a predetermined extent during their movement by the conveyor whereby sticks having insufficient bowing strength will be fractured in their passage over said shoe.

HIRAM L. BARBER.
GEORGE L. SELLARS.

REFERENCES CITED

The following references are of record in the file of this patent:

UNITED STATES PATENTS

| Number | Name | Date |
|---|---|---|
| 1,096,399 | Smith | May 12, 1914 |
| 1,200,086 | Cruser | Oct. 13, 1916 |
| 1,336,543 | Stull | Apr. 13, 1920 |
| 1,443,193 | Phelps | Jan. 23, 1923 |
| 1,616,641 | Tainter | Feb. 8, 1927 |
| 1,756,016 | Wright | Apr. 29, 1930 |
| 1,946,438 | Drake | Feb. 6, 1934 |
| 2,011,332 | Chapman | Aug. 13, 1935 |
| 2,246,107 | Ruau | June 17, 1941 |

Certificate of Correction

Patent No. 2,515,392 July 18, 1950

HIRAM L. BARBER ET AL.

It is hereby certified that error appears in the printed specification of the above numbered patent requiring correction as follows:

Column 10, line 26, after "and" and before "for" insert *a stationary stick engaging element*;

and that the said Letters Patent should be read as corrected above, so that the same may conform to the record of the case in the Patent Office.

Signed and sealed this 17th day of October, A. D. 1950.

[SEAL]

THOMAS F. MURPHY,
*Assistant Commissioner of Patents.*